Patented Feb. 26, 1952

2,587,533

UNITED STATES PATENT OFFICE 2,587,533

RIBOFLAVIN-FORMALDEHYDE REACTION PRODUCT

Karl Schoen, Kew Gardens, and Samuel M. Gordon, Forest Hills, N. Y., assignors to Endo Products, Inc., Richmond Hill, N. Y., a corporation of New York No Drawing. Application April 22, 1949, Serial No. 89,158

11 Claims. (Cl. 260—211.3)

Our invention relates to a new and improved riboflavin preparation or preparations, possessing a wide range of solubility, and also to a method of making the same. This application is a continuation in part of our application Serial No. 679,575, filed on June 26, 1946.

Riboflavin, also designated as vitamin $B_2$ or vitamin G, is only slightly soluble in water at neutral or weakly acid reaction, its solubility at 20° C. being approximately 0.12 mg. per one ml. of water. In alkaline medium it is more soluble, but the solutions are not stable.

In order to increase the solubility of riboflavin in preparations for oral or parenteral use, the vitamin has been dissolved together with compounds which form water-soluble addition-products or complex salts. Substances like urea, nicotinamide, N-methylacetamide and others have been used for this purpose, reference also being made to U. S. Patent Nos. 2,358,331, 2,332,548 and 2,349,986 respectively.

Another method of increasing the solubility of riboflavin consists in the preparation of functional derivatives, by reacting one or more of its chemically reactive groups, such as the OH- or NH-groups, with acids or other compounds. Thus, riboflavin-phosphoric acids, mono- and diacetone derivatives, and glycosides have been prepared. U. S. Patent No. 2,358,356 describes derivatives of riboflavin with polybasic organic acids such as phthalic and succinic acids.

We have found that a completely new class of riboflavin derivatives can be obtained, when dissolved or suspended riboflavin is reacted with an aqueous solution of formaldehyde under alkaline conditions. The ribonflavin is dissolved or suspended in this solution. No reaction takes place in a neutral or acid medium. The reaction medium is preferably at pH 8.5-10, although any pH from 8 to 13 or more can be used. Since aqueous solutions of formaldehyde usually have a pH less than 7, we add an alkali or a base in order to establish the desired hydrogen ion concentration, expressed as pH. Any alkali or base can be used which does not itself react with formaldehyde. Without limiting the invention to those alkaline or basic reagents named hereafter, we use any inorganic or organic alkaline or basic reagents such as sodium hydroxide, potassium hydroxide, sodium carbonate, potassium carbonate, pyridine, piperidine, quinoline, triethanolamine or other alkanolamines. The amount of alkali or base which is added need not per se be sufficient to dissolve the riboflavin. The amount of formaldehyde is preferably in excess of the amount required for the reaction.

When riboflavin is thus suspended in an excess of aqueous formaldehyde solution, with the addition of suitable amounts of alkali or base, all the riboflavin goes into solution in three-four days at room temperature of 22° C. The removal of the excess formaldehyde yields an end-product or compound which is completely soluble in water. It is preferred to use an aqueous solution of formaldehyde which has a minimum pH of 9. It is also preferred to use potassium carbonate as the alkali which increases the pH of the aqueous formaldehyde solution, in order to obtain the new compounds product in a pure state.

The new end-products or compounds, after being isolated in a pure state according to the procedures outlined in the examples given below, form yellow to orange, amorphous or crystalline powders, which are very similar in appearance to riboflavin and which are almost odorless at room temperature. They dissolve readily in water and their solutions exhibit the typical green fluorescence of riboflavin in neutral or weakly acid solutions. This fluorescence disappears in strongly acid or alkaline solution or medium, as in the case of pure riboflavin. The new compounds possess the biological activity of riboflavin to varying degrees. With varying relative amounts of formaldehyde, of alkali or base, and length of reaction time, different products can be obtained which contain from 10 to 60% of chemically bound formaldehyde in their respective molecule. Their solubility ranges from approximately 5 mg. to 500 mg. per one ml. of water at 20° C., and products with a high formaldehyde content are very hygroscopic. The aqueous solutions of the new products do not give the reactions of free formaldehyde.

The new condensation compounds of riboflavin and formaldehyde are very soluble in water and glycerol, also soluble in propylene glycol and slightly soluble or insoluble in methanol, ethanol, acetone, benzene, ether and many hydrocarbon solvents.

The pure monomethylol riboflavin and the pure dimethylol riboflavin have definite melting points, and decompose at their melting points. The trimethylol riboflavin, which is a mixture of different isomers, does not have a sharp melting point, and decomposes over a wide range of temperature, as 135° C.–150° C.

Solutions of the new compounds do not contain free formaldehyde and they are not attacked at room temperature of about 20° C. by potassium permanganate for some length of time. It is well-known that at 20° C., potassium permanganate instantly oxidizes formaldehyde.

Since the new compounds are inert to potassium permanganate in the cold, this proves that new compounds have been formed. When heated to 50° C. or higher in the presence of sulfuric acid, potassium permanganate readily oxidizes the new compounds.

Weak organic acids, such as acetic acid, do not split the new compounds even at 100° C., and one-tenth normal hydrochloric acid solution does not attack the compounds at 37° C. However, when heated to boiling with strong sulfuric or hydrochloric acid, the compounds are hydrolyzed and formaldehyde is split off. A quantitative determination of the formaldehyde which is thus liberated shows that the recovery of the formaldehyde is never complete and by present methods of analysis, we have found only up to 50% of the original combined formaldehyde.

In neutral and acid solution up to a pH value of 3, the new compounds withstand repeated autoclaving. The stability of the aqueous solutions of the new compounds towards heat depends upon the respective pH of the respective aqueous solution of formaldehyde which is used in the reaction.

Table I shows the resistance towards repeated autoclaving, as a function of the pH.

TABLE I

*Stability of methylol riboflavin solutions on repeated autoclaving (fluorometric assay)*

| pH | Original assay mg./1 ml. | 1x | Autoclaved 2x mg./1 ml. | 3x | 4x |
|---|---|---|---|---|---|
| 3.6 | 4.0 | 4.2 | 4.0 | | 3.8 |
| 4.6 | 4.0 | 4.0 | 4.3 | 3.3 | 3.2 |
| 5.6 | 4.0 | 3.8 | 3.3 | 3.2 | 2.1 |
| 6.9 | 4.0 | 1.8 | 1.1 | 0.3 | |
| 8.1 | 4.0 | 3.2 | 2.8 | 2.0 | 1.1 |

The chemical composition of the reaction products varies depending on the reaction time, the excess of formaldehyde used, the quantity of alkali, and the reaction temperature. We have been able to prepare compounds which contain an equivalent of riboflavin as high as 90% and as low as 40% by merely changing these conditions.

During the reaction of riboflavin with excess formaldehyde, a mixture of compounds is usually formed rather than a single substance. We have been able to isolate, by fractional crystallization, two of these compounds in a relatively pure state. One of these contains 1 mole formaldehyde combined with one mole of riboflavin, the other contains 2 moles of formaldehyde per mole of riboflavin.

The solubility of the compounds in water depends on the number of formaldehyde groups bound in the molecule.

TABLE II

*Solubility and melting points of methylol riboflavin compounds*

| | Solubility mg./1 ml. | Melting point, °C. |
|---|---|---|
| Riboflavin | 0.1 | 275 |
| Mono-methylol compound | 12 | 232-234 |
| Di-methylol compound | 80 | 207-209 |
| Tri-methylol compd. (mixture) | 120 | 135-150 |

While the lower members show a limited solubility, the higher ones have a strong tendency to form stable supersaturated solutions. Compounds with four or more methylol groups are hygroscopic.

The absorption spectra of the new compounds are almost identical with that of riboflavin, except that the maximum at 375 mu is slightly shifted to shorter wave lengths. The extinction coefficients of the mono- and dimethylol compounds at the maximum of 445 mu correspond quantitatively to their respective riboflavin content.

Whereas riboflavin is levorotatory in alkaline and neutral solution and optically inactive in acid solution, the new compounds are all strongly dextrorotatory both in alkaline and acid medium.

TABLE III

*Optical rotation of riboflavin and methylol compounds*

| | $[\alpha]_D$ — | |
|---|---|---|
| | in water | in ½ saturated Na borate solution |
| Riboflavin | [1] −114° | +350° |
| Monomethylol compd | +220° | +325° |
| Dimethylol compd | +124° | +256° |
| Trimethylol compd. (mixture) | +40° | +207° |

[1] In N/75 NaOH.

The rotation of riboflavin is reversed from levo to dextro rotation in borate solution. The rotation of our new compounds increases in borate solution but is not reversed. It is interesting to note that the rotation is highest in the monomethylol compound and decreases with increasing formaldehyde content.

Illumination of the new compounds in alkaline medium causes decomposition, exactly as in the case of riboflavin. From the illuminated solutions, lumiflavin has been isolated in a pure state, identified by melting point and mixed melting point with lumiflavin from riboflavin.

Acetylation of the methylol compounds with acetyl chloride or acetic anhydride in pyridine gives tetra-acetates, thus proving the presence of four free hydroxyl groups, the same number as in riboflavin. The acetates are soluble in methanol, ethanol, chloroform and acetone, and insoluble in water and hydrocarbon solvents. They are optically inactive.

The condensation of the formaldehyde with riboflavin takes place at the hydroxylated side chain or ribityl group of the riboflavin and not at the ring system. This follows from the qualitative and quantitative study of the absorption spectra and fluorescence, which indicate that the chromophoric systems both in riboflavin and the methylol compounds are identical. Addition of any group at the ring system would probably cause a more or less profound change in color and fluorescence.

Another proof for the condensation of the formaldehyde at the side chain is the reversal of the optical rotation in the new compounds, which can only happen when the optically active part of the molecule is directly involved.

Still another proof is the formation of lumiflavin upon illumination of the methylol compounds.

A final proof for this fact lies in the results of the periodate oxidation which are summarized in Table IV.

TABLE IV

Periodate oxidation of riboflavin and methylol compounds

|  | Riboflavin | | Dimethylol compd. | | |
| --- | --- | --- | --- | --- | --- |
|  | 1 hr. | 14 hrs. | 1 hr. | 4 hrs. | 20 hrs. |
| Moles HIO₄ consumed | 3.95 | 4.20 | 5.07 | 5.22 | 5.45 |
| Moles HCHO isolated | (¹) | 1.04 | -------- | 1.30 | -------- |
| Moles HCOOH isolated | (¹) | 1.82 | -------- | 2.42 | -------- |

¹ 2 hours.

The results show that the oxidation is complete within 1 to 2 hours. Riboflavin uses 4 moles and the dimethylol compound uses 5 moles of periodic acid. The higher values found after 4 and 20 hours are doubtlessly due to some secondary oxidation of formaldehyde or of formic acid.

The determination of formic acid gives an average of 1.82 mole per mole riboflavin and 2.42 moles for the dimethylol compound, both of which are close to the theoretical values of 2.0 and 3.0 moles respectively.

The total yield of 3 moles oxidation product for riboflavin (1 mole formaldehyde and 2 formic acid) and of 5 moles for the dimethylol compound (2 moles formaldehyde and 3 formic acid) point to the correctness of our assumption of the composition of the dimethylol riboflavin. It also proves definitely that the methylol groups are attached to the side chain, because if they were attached to the ring system they would not be oxidized by periodic acid.

The general formula of riboflavin is $C_{17}H_{20}N_4O_6$, with a molecular weight of 376.334 or approximately 376.

The structural formula of riboflavin is,

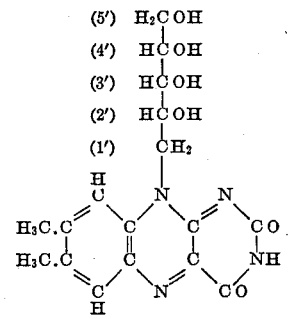

The sugar-like side chain or ribityl group has five carbon atoms, four of which have hydroxyl groups. These four hydroxyl groups are linked to carbon atoms 2', 3', 4' and 5'.

From the tests which we have made, we believe that the end-product is a methylol or formaldehyde riboflavin, in which one or more methylol groups, $OCH_2$, are added to one or more carbon atoms in this side chain.

As one example, it is assumed that a single group, $OCH_2$, is added to the No. 5' carbon atom of the side chain.

In such case, the reaction is as follows:

(2)   $H_2C-OH + OCH_2 \rightarrow H_2C.OCH_2.OH$

The $OCH_2$ group which is thus added, may also be designated as an oxymethylene group. We believe that the first mole of formaldehyde condenses with the primary hydroxy group. This addition or condensation takes place without loss of water, and with the formation of a hemiacetal or hydroxylated ether. The hemiacetal group is

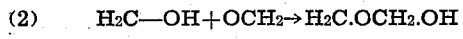

From the above, it is clear that since the molecular weight of formaldehyde is 30.02, or approximately 30, it is necessary to use approximately one gram of formaldehyde per 12.5 grams of riboflavin, in order to add one $OCH_2$ group. In the examples later stated herein, we use an excess of formaldehyde.

If a monomethylol riboflavin is produced, this has a molecular weight of approximately 406, and its molecule has approximately 92% of riboflavin. This monomethylol derivative has the general formula $C_{18}H_{22}N_4O_7$ and it is produced according to Example 6.

If a dimethylol riboflavin is produced, this has a molecular weight of approximately 436, and its molecule has approximately 86% of riboflavin.

Similarly, the trimethylol and tetramethylol riboflavins have respective molecular weights of approximately 466 and 496 and they respectively have approximately 81% and 75% of riboflavin in their respective molecules.

Assuming that a multiple chain condensation or addition takes place at the No. 5' carbon atom, as one example, the result is indicated as follows:

In the above "n" represents a whole number which is 2 or greater than 2.

Hence a large number of isomers can be produced, because one or more $OCH_2$ groups can be added at any of said four side-chain carbon atoms 2', 3', 4' and 5', or at any plurality of said side-chain carbon atoms.

As mentioned above, we can prepare condensation products in which the proportion of riboflavin in the molecule of the new product or mixture of new products is as low as 40% and more than 90%.

As above-noted, a monomethylol riboflavin has 92% of riboflavin in its molecule.

If the molecule of the new methylol riboflavin has 40% of riboflavin, this corresponds to a molecular weight of approximately 940 of the methylol riboflavin, which corresponds to the addition of eighteen $OCH_2$ groups.

The biological activity of the new compounds is directly related to their riboflavin content. The reaction period is an important factor in determining the proportion of riboflavin in the new compounds. More $OCH_2$ groups are added as the reaction period is increased. This is illustrated in Table V.

TABLE V

Influence of reaction time upon biological activity of methylol-riboflavin

| Reaction time in hours | Assay | |
| --- | --- | --- |
|  | Fluorometric, per cent | Microbiological, per cent |
| 4 | 94 | 55.5 |
| 7 | 92 | 52.0 |
| 8 | 92 | 48.8 |
| 17 | 92 | 34.0 |
| 48 | 88 | 19 |
| 72 | 66 | 0.7 |
| 96 | 61 | 7 |

Preparations with as high as 55% microbiological activity can be obtained upon short reaction time, when only 1 mole formaldehyde combines with 1 mole riboflavin. Upon addition of two or more moles formaldehyde, this activity falls off rapidly.

Without limiting the scope of our invention to the details or examples described hereafter, we state some examples for the preparation and isolation of the new compounds which form the subject of this invention.

EXAMPLE 1

We use an aqueous solution of formaldehyde which is according to the standards of the United States Pharmacopoeia. This contains not less than 37% by weight of formaldehyde, H.CHO, with variable amounts of ethanol or methanol, or both, to prevent polymerization.

We mix 100 cubic centimeters of said standard solution with 50 cubic centimeters of water.

5 grams of finely divided riboflavin are then suspended in said 150 cubic centimeters of aqueous formaldehyde solution, at ordinary room temperature, which is substantially 20° C.

Powdered potassium carbonate is then dissolved in the water of said suspension, until the pH is substantially 9. This is done at ordinary room temperature. The suspension is kept at said room temperature for three days, with occasional shaking, until all the riboflavin has dissolved.

Acetic acid is then added at room temperature to bring the pH to 5.

The solution is then heated in a suitable open receptacle over a free flame, until substantially all the odor of formaldehyde has disappeared. During this heating step, water is occasionally added, to maintain a constant volume of 150 cubic centimeters.

The solution is then evaporated to dryness on a steam bath, until a dark, brown-red residue is secured.

This residue is treated with consecutive portions of anhydrous ethanol at 50°–70° C., until the residue becomes crystalline and wholly solid.

The residue is then separated by filtration at 20° C. from the liquid, it is washed one or more times with anhydrous ethanol at 20° C., and it is finally dried in a vacuum desiccator.

The resultant new compound has 67% by weight of riboflavin. It melts at substantially 150° C., but the melting point is not sharp and the compound decomposes when melted.

The reaction may take place between the suspended riboflavin and the aqueous formaldehyde solution, or between the dissolved riboflavin and the dissolved formaldehyde.

EXAMPLE 2

We add 0.80 gram of anhydrous sodium carbonate to 100 cubic centimeters of said standard solution of formaldehyde at 20° C. to raise its pH to within the above-mentioned reaction range.

20 grams of finely divided riboflavin are suspended in said solution. The suspension is kept in the dark at 20° C., during a period of three days, with occasional shaking. All the riboflavin is now dissolved. We then add 200 cubic centimeters of anhydrous methanol at 20° C. The solution is filtered, and it is then poured into 1,500 cubic centimeters of anhydrous acetone at 20° C., with occasional stirring. An orange-colored precipitate is produced. This is separated by filtration at 20° C., washed with anhydrous acetone at 20° C., and dried in a vacuum desiccator, using phosphorous pentoxide as the desiccating agent.

The yield of the new compound is 22 grams. It has a riboflavin content of 66% by weight.

EXAMPLE 3

We add 0.80 gram of powdered, anhydrous, sodium carbonate to 100 cubic centimeters of a formaldehyde solution which contains 40% by weight of formaldehyde, in order to raise the pH to within said reaction range.

We suspend 20 grams of riboflavin in said solution. This is done at 20° C., and in general, in all the operations disclosed in all the examples, we use a temperature of 20° C., unless otherwise specified. The suspension is kept for 36 hours, with occasional shaking. Some of the riboflavin remains undissolved at the end of said period of 36 hours. We then add 200 cubic centimeters of anhydrous methanol to the batch. The undissolved material is removed by filtration. The solution is poured into 1,800 cubic centimeters of anhydrous acetone, producing a precipitate. After 15 minutes, the precipitate is removed by filtration, washed thoroughly with anhydrous acetone, and dried in a vacuum desiccator, so as to dry it thoroughly, as in the preceding examples.

The yield of the new compound is 18 grams. It contains 76% by weight of riboflavin.

In following this example, the reaction period can be shortened from 36 hours to 17 hours, or 10 hours. We thus obtain a smaller yield of the new compounds, but their riboflavin content is increased respectively to 85% and 90% of riboflavin by weight.

EXAMPLE 4

1 gram of finely divided riboflavin is suspended in 50 cubic centimeters of said standard formaldehyde solution. 50 milligrams of anhydrous potassium carbonate are dissolved in the water of the dispersion, thus raising the pH to within said reaction range. The suspension is kept at room temperature for 5 days, until all the riboflavin has dissolved. The solution is then intermixed with 100 cubic centimeters of anhydrous methanol. The solution is then poured into one liter of anhydrous acetone. A brown precipitate is produced. This is collected in a centrifuge cup, washed with anhydrous acetone, and then dried in a vacuum desiccator.

The yield of the new compound, which is a brown powder, is 1.2 grams. Its riboflavin content is 40% by weight. Said powder is hygroscopic and it becomes liquid when exposed to air.

EXAMPLE 5

20 grams of finely divided riboflavin and 0.80 gram of anhydrous potassium carbonate are added to 100 cubic centimeters of a 40% formaldehyde solution.

The potassium carbonate is dissolved in the water, and the riboflavin remains in suspension.

The pH is 9.1. The suspension is shaken by a mechanical shaker for 16 hours.

The pH is then lowered from 9.1 to 5.5 by the addition of glacial acetic acid, and 200 cubic centimeters of anhydrous methanol are added. The undissolved material is removed by filtration. The solution is poured into 1,800 cubic centimeters of anhydrous acetone. The resultant yellow precipitate is separated by centrifuging. Said precipitate is given three washings with acetone, two washings with anhydrous ethyl ether, and then dried as previously stated.

The yield of the new compound is 18 grams.

The reaction time can be shortened to 5 hours or less, if more alkali or base is used, and provided the mixture is shaken or stirred well. We do not confine the scope of our invention to any particular reaction time, volume of formaldehyde or amount of base or alkali used as catalyst.

EXAMPLE 6

100 grams of riboflavin and 4 grams of potassium carbonate are suspended in 500 cubic centimeters of said aqueous formaldehyde solution and the mixture is stirred at 30° C. for 8 hours. At the end of this period, 5 cubic centimeters of glacial acetic acid and one liter of methanol are added, with stirring. The solution is freed from undissolved material by filtration and the clear solution is poured slowly at about 20° C.-22° C. with vigorous stirring into 8 liters of anhydrous acetone. The resultant precipitate is filtered off, washed repeatedly with anhydrous acetone and with ether, and then dried at room temperature and with vacuum. The resultant dried powder is dissolved in hot water at 95° C. to give an aqueous solution of 20% by weight. This solution is kept in the dark at room temperature for 3-4 weeks, after which time a large amount of material crystallizes out of the solution. This crystallized material is removed by filtration and re-crystallized from hot water. A small amount of dark red insoluble material is filtered from the hot solution. This re-crystallization step is repeated four times. The resultant end product is monomethylol riboflavin, which crystallized in small orange clusters. It has a melting point of 232° C.-234° C. with decomposition, and it becomes dark when heated above 225° C.

$$[\alpha]_D^{23} = \frac{+1.79 \times 100}{2 \times 0.406} = +220° \text{ (in water)}$$

$$[\alpha]_D^{23} = \frac{+1.32 \times 100}{2 \times 0.203} = +325° \text{ (in } \frac{1}{2} \text{ satd. sodium borate soln.)}$$

Calcd. for $C_{18}H_{22}N_4O_7 \cdot 3H_2O$
(mol. wt. 460.43): C, 46.95   H, 6.27   N, 12.17
Found:            C, 47.34   H, 6.02   N, 12.41
                     47.36      5.88      12.12

*Acetate.*—Five grams monomethyl riboflavin are dissolved in 40 ml. pyridine and 40 cubic centimeters of acetic anhydride by short heating on a steam bath, then kept over-night at room temperature in the dark. The solution is concentrated to 15 cubic centimeters and poured into 500 cubic centimeters of anhydrous ether wtih stirring. After keeping the mixture in ice water for two hours, the precipitate is centrifuged off, washed repeatedly with ether and crystallized twice from ethanol. The ethanol solutions tend to form a gel upon standing.

Yellow to orange microcrystals, M. P. 192° C.-194° C., sinters at 189° C. Very soluble in acetone, chloroform and methanol, insoluble in water, ether, benzene.

$$[\alpha]_D = \frac{\pm 0.1 \times 100}{1 \times 1.27} = \pm 8°$$

Calcd. for $C_{26}H_{30}N_4O_{11}$
(mol wt. 474.5): C, 54.35   H, 5.26   N, 9.75
Found:                   54.37      5.38      9.06
                  54.18      5.01      8.96

EXAMPLE 7

*Dimethylol riboflavin.*—One hundred grams riboflavin are suspended in 500 cubic centimeters of said formaldehyde solution, 4 grams potassium carbonate are added, and the suspension is shaken mechanically for 16 hours at room temperature. At the end of this time the pH of the solution is adjusted to 5.4 with glacial acetic acid, one liter of mechanol is added wtih stirring, the solution is filtered and run into 8 liters acetone with vigorous stirring. The precipitate is filtered off, washed with acetone and ether and dried in vacuum.

240 grams of material obtained this way from 3 batches of 100 grams each, are dissolved in 2 liters water by heating on the steam bath and the solution is kept 10 days at room temperature in the dark. After this time, a small dark green precipitate is filtered off, and the solution is run into 12 liters of acetone with stirring. The resulting precipitate is washed with acetone and ether, and dried. It is then dissolved in glycerol by heating on the steam bath, and the glycerol solution is filtered through a hot water funnel and kept 3 days at room temperature in the dark. The crystals are filtered off, and recrystallized the same way from glycerol. After filtering, the solvent is removed by thorough washing with absolute ethanol. An orange powder is obtained, M. P. 207° C.-209° C., with decomposition dark at 198° C.

$$[\alpha]_D^{20} = \frac{+2.45 \times 100}{1 \times 1.982} = +123.6° \text{ (in water)}$$

$$[\alpha]_D^{19} = \frac{+2.68 \times 100}{1 \times 0.96} = +256° \text{ (in } \frac{1}{2} \text{ satd. Na-borate solution)}$$

Calcd. for $C_{19}H_{24}N_4O_8 \cdot 3H_2O$
(mol. wt. 490.46): C, 46.53   H, 6.17   N, 11.42
Found:                   46.50      6.03      10.87
                  46.17      6.18      11.18

*Acetate.*—The acetate of dimethylol riboflavin is prepared exactly as the monomethyl derivative. Orange powder, M. P. 194° C., sinters at 160° C. Optically inactive.

Calcd. for $C_{27}H_{32}N_4O_{12}$
(mol. wt. 604.05): C, 53.63   H, 5.30   N, 9.28
Found:                   53.10      5.84      9.11
                  53.32      5.60      9.39

In making the acetic acid ester of the monomethyl riboflavin with acetic anhydride, the reaction at the No. 5' carbon molecule, for example is,

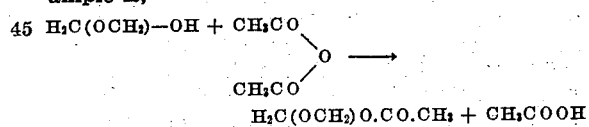

$$H_2C(OCH_2)O.CO.CH_3 + CH_3COOH$$

When acetyl chloride is used, the reaction is,

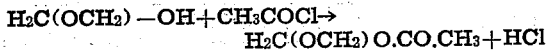

$$H_2C(OCH_2)-OH + CH_3COCl \rightarrow$$
$$H_2C(OCH_2)O.CO.CH_3 + HCl$$

The reaction is the same in making the acetic acid ester or acetate of the dimethylol riboflavin and other polymethylol riboflavins.

Thus, when used the dimethylol riboflavin and acetic acid anhydride, the reaction, as one example, is as follows:

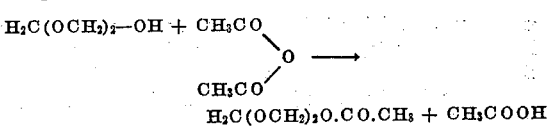

$$H_2C(OCH_2)_2.O.CO.CH_3 + CH_3COOH$$

In these reactions, we form the tetra-acetates.

While we have disclosed some illustrative examples, numerous changes and omissions and additions can be made in and to this illustrative disclosure, without departing from the scope of our invention.

We can contact riboflavin in any manner with an aqueous solution of formaldehyde whose pH exceeds 7. The formaldehyde solution may or may not contain antipolymerization ingredients.

We can use pure and freshly prepared formaldehyde solution. We can use any means or method to remove the unreacted formaldehyde, or to produce a reaction product which is free or substantially free from free formaldehyde.

The solubility of riboflavin in water at 25° C. is 12 milligrams of riboflavin in 100 cc. of water. We claim any preparation of the class disclosed, which has greater solubility than riboflavin.

Our prior application, Serial No. 679,575 fully discloses the methylol riboflavins disclosed herein, and their method of manufacture, but without disclosing their acetates or other esters.

Our invention includes the compounds disclosed herein if the $OCH_2$ group or groups are linked directly or indirectly to the respective carbon atom or atoms of the sugar-like side chain.

We have disclosed the preparation of acetates of the new methylol riboflavins. Our invention includes other esters of the new methylol riboflavins with other organic acids and also with inorganic acids.

In producing an acetate or ester, we replace an H atom of one or more of the hydroxy groups by another group. Our invention is not limited to a replacement which results in an ester, as other groups may be substituted, so that our invention includes various derivatives of the new methylol riboflavins, which have the ring structure of riboflavin, and a modified sugar-like side chain.

1. A methylol derivative of riboflavin wherein at least one hydroxyl of the ribityl group is replaced by $O(CH_2O)_nH$, $n$ being a positive integer whose minimum value is one and whose maximum value is eighteen, the maximum number of $CH_2O$ groups in the entire molecule of said derivative being eighteen, said derivative having the ring group of riboflavin and being substantially free from formaldehyde.

2. A methylol derivative of riboflavin wherein at least one hydroxyl of the ribityl group is replaced by $O(CH_2O)_nH$, $n$ being a positive integer whose minimum value is one and whose maximum value is eighteen, the maximum number of $CH_2O$ groups in the entire molecule of said derivative being eighteen, said derivative having the ring group of riboflavin and being substantially free from formaldehyde, said derivative being dextro-rotary in aqueous alkaline solution and also in aqueous acid solution.

3. A condensation compound of riboflavin and formaldehyde, said condensation compound being substantially free from formaldehyde and having the ring group of riboflavin and a condensed ribityl group, at least one hydroxyl of said ribityl group being replaced by

$n$ being a positive integer whose minimum value is one and whose maximum value is eighteen, the maximum number of $CH_2O$ groups in the entire molecule of said condensation compound being eighteen.

4. A methylol derivative of riboflavin wherein at least one hydroxyl of the ribityl group is replaced by $O(CH_2O)_nH$, $n$ being a positive integer whose minimum value is one and whose maximum value is eighteen, the maximum number of $CH_2O$ groups in the entire molecule of said derivative being eighteen, said derivative having the ring group of riboflavin and being substantially free from formaldehyde, said derivative having a minimum solubility of substantially five milligrams in one cubic centimeter of water at 20° C.

5. A methylol derivative of riboflavin wherein at least one hydroxyl of the ribityl group is replaced by $O(CH_2O)_nH$, $n$ being a positive integer whose minimum value is one and whose maximum value is eighteen, the maximum number of $CH_2O$ groups in the entire molecule of said derivative being eighteen, said derivative having the ring group of riboflavin and being substantially free from formaldehyde, the entire molecule of said derivative having substantially 40% to 90% of riboflavin therein.

6. A method of making a reaction product of riboflavin and formaldehyde, which consists in contacting riboflavin with an aqueous solution of formaldehyde whose pH exceeds 7.

7. A method according to claim 6, in which said pH is at least substantially 8.

8. A method of making a reaction product of riboflavin and formaldehyde, which consists in contacting riboflavin with an aqueous solution of formaldehyde whose pH exceeds 7, until the riboflavin is dissolved in said solution and the reaction product is formed in said solution, then lowering the pH of said solution of said reaction product to below 7, some of the formaldehyde remaining unreacted in said solution, removing substantially all of the unreacted formaldehyde, evaporating the solution of the reaction product, and purifying the residue.

9. A method of making a reaction product of riboflavin and formaldehyde, which consists in making said reaction product in solution by contacting riboflavin with an aqueous solution of formaldehyde whose pH exceeds 7, leaving some of the riboflavin unreacted and dispersed in said solution, intermixing said solution with a liquid in which the unreacted riboflavin is insoluble and the reaction product is soluble, removing undissolved material from said mixture, and precipitating the reaction product by mixing said solution with a liquid in which said reaction product is insoluble.

10. A method according to claim 8 in which said pH is at least substantially 8.5.

11. A method according to claim 9 in which said pH is at least substantially 8.5.

KARL SCHOEN.
SAMUEL M. GORDON.

REFERENCES CITED

The following references are of record in the file of this patent:

H. R. Rosenberg: Vitamins, 1942, pp. 156–158, 3 pages.

Schoen et al.: Arch. Biochem., v. 22 (1949), pp. 149–159, 11 pages.